US012244394B2

(12) United States Patent
Maekawa

(10) Patent No.: US 12,244,394 B2
(45) Date of Patent: Mar. 4, 2025

(54) INFORMATION PROCESSING DEVICE, PROGRAM, INFORMATION PROCESSING SYSTEM, AND INFORMATION PROCESSING METHOD

(71) Applicant: SoftBank Corp., Tokyo (JP)

(72) Inventor: Naoki Maekawa, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/642,728

(22) Filed: Apr. 22, 2024

(65) Prior Publication Data

US 2024/0275468 A1   Aug. 15, 2024

Related U.S. Application Data

(63) Continuation of application No. PCT/JP2022/044230, filed on Nov. 30, 2022.

(30) Foreign Application Priority Data

Dec. 13, 2021 (JP) ................. 2021-202040

(51) Int. Cl.
*H04B 7/00* (2006.01)
*H04B 7/185* (2006.01)

(52) U.S. Cl.
CPC ................. *H04B 7/18504* (2013.01)

(58) Field of Classification Search
CPC ...... H04B 7/15; H04B 7/185; H04B 7/18504; H04B 7/18506; H04W 16/28
See application file for complete search history.

(56) References Cited

U.S. PATENT DOCUMENTS

2020/0142423 A1   5/2020 Ueda
2021/0194583 A1*  6/2021 Maho ................. H04B 10/1123
(Continued)

FOREIGN PATENT DOCUMENTS

JP    2019197268 A    11/2019
JP    2020069969 A    5/2020
(Continued)

OTHER PUBLICATIONS

International Search Report and Written Opinion (ISA/237) of the International Search Authority for International Patent Application No. PCT/JP2022/044230, mailed by the Japan Patent Office on Mar. 7, 2023.
(Continued)

*Primary Examiner* — Erika A Washington

(57) ABSTRACT

An information processing device is provided comprising a situation-related information reception unit that receives, for a flight vehicle that functions as a stratospheric platform and forms a wireless communication area by radiating an SL beam from an SL antenna to provide wireless communication service to user terminals within the wireless communication area, situation-related information related to a sky situation above a ground area where the wireless communication service is provided and a deployment determination unit that determines deployment of a mobile object to an area, among the ground area, in which a sky situation meets a predetermined situation condition, based on the situation-related information, in order to establish a feeder link between a gateway mounted on the mobile object and the flight vehicle.

19 Claims, 7 Drawing Sheets

(56) References Cited

U.S. PATENT DOCUMENTS

| | | | |
|---|---|---|---|
| 2022/0173794 A1* | 6/2022 | Konishi | H04W 24/02 |
| 2022/0182132 A1* | 6/2022 | Hirai | H04B 17/345 |
| 2022/0209848 A1* | 6/2022 | Omote | H04B 7/18504 |

FOREIGN PATENT DOCUMENTS

| | | | |
|---|---|---|---|
| JP | 2020167539 A | 10/2020 | |
| JP | 2021019335 A | 2/2021 | |

OTHER PUBLICATIONS

Decision to Grant a Patent issued for counterpart Japanese Application No. 2021-202040, transmitted from the Japanese Patent Office on Aug. 9, 2022 (drafted on Aug. 4, 2022).

* cited by examiner mat
INFORMATION PROCESSING DEVICE, PROGRAM, INFORMATION PROCESSING SYSTEM, AND INFORMATION PROCESSING METHOD The contents of the following patent application(s) are incorporated herein by reference:
NO. 2021-202040 filed in JP on Dec. 13, 2021
NO. PCT/JP2022/044230 filed in WO on Nov. 30, 2022

BACKGROUND

1. Technical Field

The present invention relates to an information processing device, a program, an information processing system, and an information processing method.

2. Related Art

Patent document 1 describes a HAPS (High Altitude Platform Station) that establishes a feeder link with a gateway on the ground and establishes a service link with a terminal on the ground to provide a wireless communication service to a terminal by relaying communication between the gateway and the terminal.

PRIOR ART DOCUMENTS

[Patent Document] Patent Document 1: Japanese Patent Application Publication No. 2020-167539

DESCRIPTION OF EXEMPLARY EMBODIMENTS

When establishing a high-frequency feeder link of a microwave, millimeter wave, or laser light communication between HAPS and a gateway on the ground, or when establishing a high-frequency service link for providing a 5G mobile communication service, there were cases where maintaining the line is difficult due to weather conditions. In order to maintain high operation rate of the line, it was necessary to dynamically avoid poor environment for such maintenance of high operation rate of the line. A point where lines of a feeder link and a service link can be established is discovered by localized weather forecasting or weather prediction in advance, and a gateway is towed, by an automobile or a ship that is capable of autonomously or automatically moving, to the point where the lines can be established. For example, after the gateway has arrived at the point where the lines can be established, a feeder link is established between a HAPS and the gateway, and a service link is established between the HAPS and a UE (User Equipment). In addition, by mounting a facility that is capable of observing the weather on the automobile or the ship on which the gateway is mounted and the HAPS, data collection can be performed, and with the data, the optimal positions of the HAPS and the gateway can be calculated while taking into consideration the performance of the feeder link and the performance of the service link.

Hereinafter, the present invention will be described through embodiments of the invention, but the following embodiments do not limit the invention according to claims. In addition, not all of the combinations of features described in the embodiments are imperative to the solving means of the invention.

Figure 1:
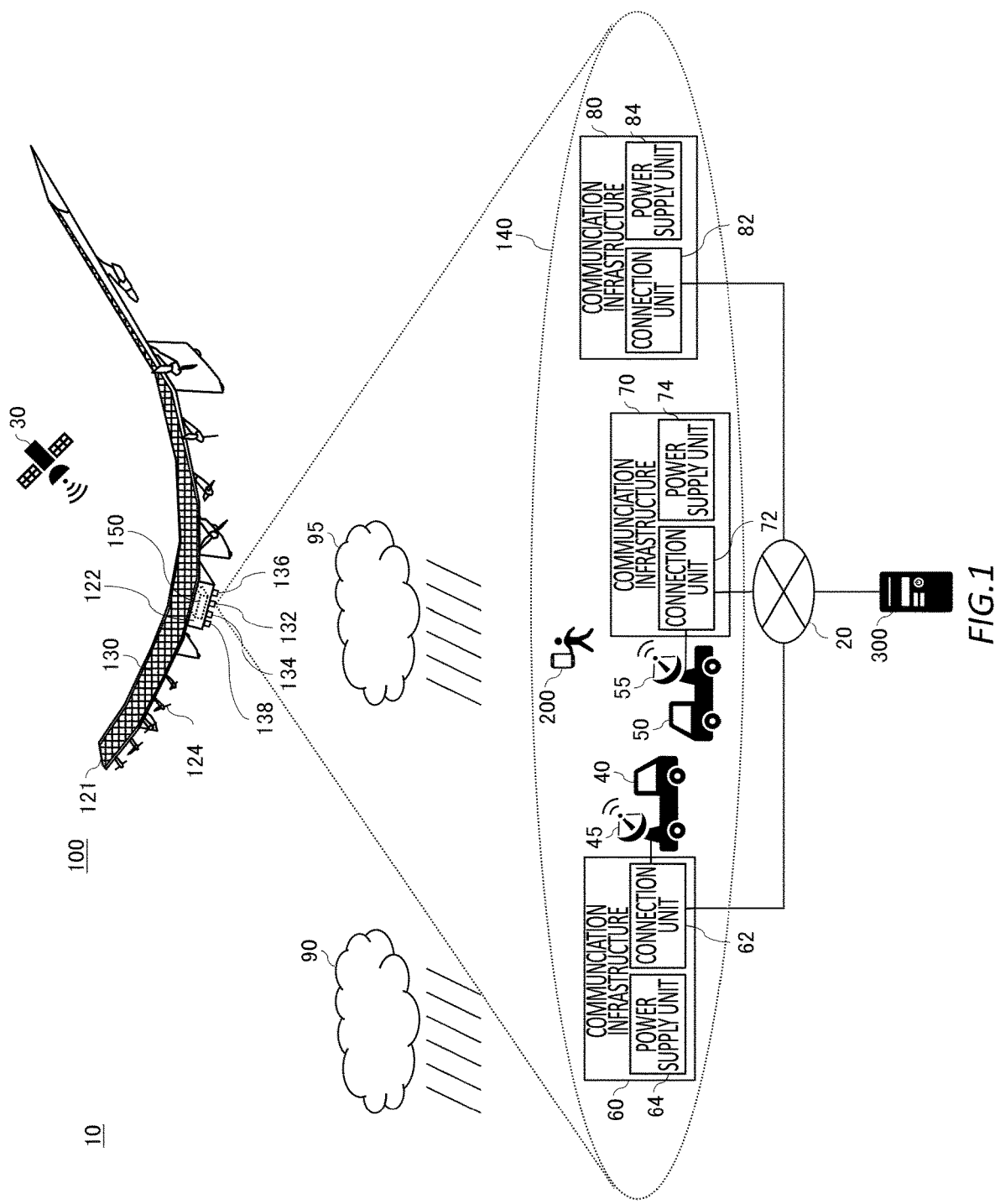
FIG. 1 schematically illustrates an example of a system 10.

FIG. 1 schematically illustrates an example of a system 10. The system 10 comprises a flight vehicle 100. In FIG. 1, an example in which the system 10 comprises one flight vehicle 100 is illustrated. The system 10 may comprise a plurality of flight vehicles 100. The system 10 may comprise an information processing device 300. The system 10 may comprise a plurality of mobile objects. In FIG. 1, an example in which the system 10 comprises two mobile objects including a mobile object 40 and a mobile object 50 is illustrated. The number of mobile objects included in the system 10 is not limited to two, and may be another number. The system 10 may comprise a plurality of communication infrastructures. In FIG. 1, an example in which the system 10 comprises three communication infrastructures including a communication infrastructure 60, a communication infrastructure 70, and a communication infrastructure 80 is illustrated. The number of communication infrastructures included in the system 10 is not limited to three, and may be another number.

The flight vehicle 100 has a main wing 121, a main body 122, a propeller 124, a solar panel 130, an SL antenna 132, an FL antenna 134, an FL antenna 136, and a satellite communication antenna 138. A battery is deployed in at least either the main wing 121 or the main body 122. The battery stores electric power generated by the solar panel 130. The main body 122 includes an information processing device 150, and a flight control device and a base station device that are not illustrated.

The flight control device controls the flight of the flight vehicle 100. The flight control device causes the flight vehicle 100 to fly by rotating the propeller 124 with the electric power stored in the battery, for example.

The base station device forms a wireless communication area 140 by radiating an SL beam by using the SL antenna 132 to provide wireless communication service to a user terminal 200 in the wireless communication area 140. The base station device establishes a service link with the user terminal 200 in the wireless communication area 140 by using the SL antenna 132, for example. The base station device establishes a service link with the mobile object by using the SL antenna 132, for example. The base station device adjusts the radiated position, the radiation range or the like of the SL beam by means of beamforming technology, for example.

The SL antenna 132 may be a multi-beam antenna. The wireless communication area 140 may be a multi-cell.

The frequency of the SL beam is in a millimeter wave band, for example. The frequency of the SL beam may also be in a Sub6 band.

The user terminal 200 may be any communication terminal as long as it is a communication terminal that is capable of establishing a service link with the flight vehicle 100. For example, the user terminal 200 is a mobile phone such as a smartphone, a tablet terminal, a wearable terminal, and the like. The user terminal 200 may be a PC (Personal Computer). The user terminal 200 may be an IoT (Internet of Thing) terminal. The user terminal 200 may include anything that corresponds to IoE (Internet of Everything).

The base station device establishes a feeder link with the gateway by radiating an FL beam by using the FL antenna. The base station device adjusts the radiated position, the radiation range, or the like of the FL beam by means of beamforming technology, for example.

The base station device establishes a feeder link with the gateway by using the FL antenna 134, for example. The base station device establishes a feeder link with the gateway by using the FL antenna 136, for example. The base station device may access the network 20 via the gateway.

The base station device may establish a feeder link with each of the two gateways by using the FL antenna 134 and the FL antenna 136. The base station device may access the network 20 via each of the two gateways.

The base station device establishes a feeder link with the gateway through radio-wave wireless communication, for example. In this case, the frequency of the FL beam is in the microwave band, for example. The frequency of the FL beam may be in the millimeter wave band.

The base station device may establish a feeder link with the gateway through optical wireless communication. In this case, the frequency of the FL beam is in an infrared light band, for example.

The gateway for which the flight vehicle 100 establishes a feeder link is a gateway mounted on a mobile object, for example. The gateway for which the flight vehicle 100 establishes a feeder link may be a gateway installed on the ground.

The communication infrastructure has a connection unit for the gateway mounted on the mobile object to access the network 20. The connection unit connects to said gateway by means of wired connection, for example. Establishing and disconnecting of said wired connection is performed by a robot arm, for example. The robot arm is mounted on the mobile object, for example. The robot arm is mounted on the communication infrastructure, for example. The robot arm may be installed in the surrounding of the communication infrastructure. Establishing and disconnecting of said wired connection may be performed by a person such as a manager who manages the communication infrastructure. The connection unit may connect to said gateway through wireless connection.

The communication infrastructure has a power supply unit that supplies electric power to the mobile object, for example. The power supply unit supplies electric power to the mobile object through wired power feeding, for example. Establishing and disconnecting of the wired connection between the power supply unit and the mobile object is performed by the robot arm, for example. Establishing and disconnecting of said wired connection may be performed by a person. The power supply unit may supply electric power to said mobile object through wireless power feeding.

Note that, the communication infrastructure may not have a power supply unit. In this case, a power feeding device having a functionality similar to that of the power supply unit may be installed.

The gateway mounted on the mobile object accesses the network 20 via the connection unit of the communication infrastructure, for example. The gateway mounted on the mobile object may access the network 20 via a communication device mounted on the mobile object and a ground base station installed on the ground.

The gateway mounted on the mobile object is operated by using electric power that is fed to said mobile object from the power feeding unit of the communication infrastructure, for example. Said gateway is operated by using electric power fed from the power feeding device to said mobile object, for example. Said gateway may be operated by using electric power stored in the battery mounted on said mobile object.

The mobile object may be any mobile object as long as it is a mobile object that is capable of having the gateway mounted thereon. The mobile object is an automobile, for example. The automobile is a self-driving vehicle, for example. The mobile object is a ship, for example. The ship is a self-driving ship, for example. The mobile object may be an airplane. The airplane is an unmanned airplane such as a drone, for example.

The network 20 may include a core network provided by a communication operator. The core network is compliant with a 5G (5th Generation) communication system, for example. The core network may be compliant with a mobile communication system of a 6G (6th Generation) communication system onwards. The core network may be compliant with a 3G (3rd Generation) communication system. The core network may be compliant with an LTE (Long Term Evolution) communication system. The network 20 may include the Internet.

The base station device may establish wireless communication connection with another flight vehicle 100 by using the FL antenna 134. The base station device may establish wireless communication connection with another flight vehicle 100 by using the FL antenna 136. The base station device may access the network 20 via another flight vehicle 100.

The base station device may communicate with the communication satellite 30 by using the satellite communication antenna 138. The base station device may access the network 20 via the communication satellite 30.

The flight vehicle 100 provides the wireless communication service to the user terminal 200 by flying in a stratosphere, for example. The flight vehicle 100 may function as a stratospheric platform. The flight vehicle 100 may be a HAPS. The flight vehicle 100 covers ground area to be covered by means of wireless communication area 140, while flying in the sky above said area, for example.

The flight vehicle 100 has a functionality of acquiring flight position information indicating the flight position of the flight vehicle 100, for example. The flight vehicle 100 acquires flight position information by using the GNSS (Global Navigation Satellite System) functionality mounted on the flight vehicle 100, for example. The flight vehicle 100 acquires flight position information by using the GPS (Global Positioning System) functionality mounted on the flight vehicle 100, for example.

The flight vehicle 100 has a functionality of acquiring weather information, for example. The flight vehicle 100 acquires weather information by using a meteorological observation device mounted on the flight vehicle 100, for example.

The meteorological observation device includes a meteorological radar, for example. The meteorological observation device includes an atmospheric radar, for example. The meteorological observation device includes LiDAR (Light Detection And Ranging), for example. The meteorological observation device includes a precipitation gauge, for example. The meteorological observation device includes a snowfall gauge, for example. The meteorological observation device includes a cloud base altimeter, for example. The meteorological observation device includes an anemometer, for example. The meteorological observation device includes a thermometer, for example. The meteorological observation device includes a hygrometer, for example. The meteorological observation device includes a barometer, for example. The meteorological observation device includes a visibility meter, for example. The meteorological observation device includes a turbulence measurement device. The meteorological observation device may include an image capturing device. The image capturing device is an optical camera, for example.

The meteorological observation device may be mounted on the mobile object. The meteorological observation device may be installed at any point in the ground area for which the flight vehicle 100 provides wireless communication service. For example, the meteorological observation device may be installed in the surrounding of the communication infrastructure. The meteorological observation device may be installed in the surrounding of the gateway installed on the ground.

The information processing device 150 communicates with the information processing device 300 via the base station device. The information processing device 150 transmits the information acquired by the flight vehicle 100 to the information processing device 300 via the base station device, for example.

The information processing device 150 and the base station device may be monolithic. The information processing device 150 and the flight control device may be monolithic.

The information processing device 300 determines the deployment of the mobile object according to a sky situation of a ground area for which the flight vehicle 100 provides wireless communication service. The information processing device 300 determines the deployment of the mobile object in order to establish a feeder link between the gateway mounted on the mobile object and the flight vehicle 100 in an area, among the ground area, where the sky situation is good, for example. The area where the sky situation is good is a fine-weather area in which the weather the sky is fine, for example. The area where the sky situation is good may be an area that does not include a flight path of an airplane flying at a lower altitude than the flight vehicle 100.

The information processing device 300 determines the deployment of the mobile object based on the weather information in the sky above the ground area, for example. The information processing device 300 may determine the deployment of the mobile object based on the flight path information indicating the flight path of the airplane that flies in the sky above the ground area.

The information processing device 300 may function as an MEC (Multi-access Edge Computing). That is, the information processing device 300 may be an MEC server.

In FIG. 1, an example in which the information processing device 300 determines the deployment of the mobile object according to the weather in the sky above the ground area for which the flight vehicle 100 provides wireless communication service is mainly described. Herein, description will be made assuming, as an initial state, a state where the mobile object 40 is deployed in a region in which the communication infrastructure 60 having the connection unit 62 and the power supply unit 64 are installed, the mobile object 50 is deployed in a region in which the communication infrastructure 70 having the connection unit 72 and the power supply unit 74 are installed, and the flight vehicle 100 accesses the network 20 via the feeder link with the gateway 45 mounted on the mobile object 40.

The information processing device 300 receives weather information of the sky above the ground area from the flight vehicle 100 via the gateway 45 and the communication infrastructure 60, for example. The information processing device 300 predicts variation in the weather in the sky above the ground area based on the weather information received from the flight vehicle 100. The information processing device 300 predicts whether the variation in the weather in the sky above the ground area has an adverse impact on the feeder link that is established between the gateway 45 and the flight vehicle 100, based on the prediction result of the variation in the weather in the sky above the ground area. Herein, description will continue assuming that the information processing device 300 has predicted that the variation in the weather in which the rain clouds 90 move rightward has an adverse impact on said feeder link.

The information processing device 300 identifies a fine-weather area based on the weather information in the sky above the ground area in response to predicting that the variation in the weather in the sky above the ground area has an adverse impact on said feeder link. Herein, description will continue assuming that the fine-weather area does not include a region in which the communication infrastructure 70 is installed where rain clouds 95 exist in the sky, and includes a region in which the communication infrastructure 80 having the connection unit 82 and the power supply unit 84 is installed where rain clouds do not exist in the sky.

The information processing device 300 determines the deployment of the mobile object 50 based on the identified fine-weather area. Herein, description will continue assuming that the information processing device 300 has determined to change the deployment of the mobile object 50 from a region in which the communication infrastructure 70 is installed to a region in which the communication infrastructure 80 is installed.

The information processing device 300 deploys the mobile object 50 in the region in which the communication infrastructure 80 is installed in response to determining the deployment of the mobile object 50. The information processing device 300 controls the mobile object 50 and the flight vehicle 100 in order to establish the feeder link between the gateway 55 mounted on the mobile object 50 and the flight vehicle 100, in response to deploying the mobile object 50 in the region in which the communication infrastructure 80 is installed. The mobile object 50 and the flight vehicle 100 establishes said feeder link according to control by the information processing device 300.

In response to a feeder link being established between the gateway 55 and the flight vehicle 100, the information processing device 300 controls the flight vehicle 100 to switch the access to the network 20 from that via the feeder link between the gateway 45 and the flight vehicle 100 to that via the feeder link between the gateway 55 and the flight vehicle 100. The flight vehicle 100 switches to access to the network 20 via the feeder link between the gateway 55 and the flight vehicle 100, according to control by the information processing device 300.

The information processing device 300 predicts whether the variation in the weather in the sky above the ground area has an adverse impact on said feeder link based on the prediction result obtained by predicting the variation in the weather in the sky above the ground area, after a predetermined period has elapsed since the flight vehicle 100 switched to access to the network 20 via the feeder link between the gateway 55 and the flight vehicle 100. Herein, description will continue assuming that the information processing device 300 has predicted that the variation in the weather in which the rain clouds 95 move rightward has an adverse impact on said feeder link.

The information processing device 300 identifies a fine-weather area based on the weather information in the sky above the ground area in response to predicting that the variation in the weather in the sky above the ground area has an adverse impact on said feeder link. Herein, description will continue assuming that the fine-weather area does not include a region in which the communication infrastructure 70 is installed where rain clouds 90 that moved rightward during a predetermined period exist in the sky, and includes a region in which the communication infrastructure 60 is installed where rain clouds do not exist in the sky.

The information processing device 300 determines the deployment of the mobile object 40 based on the identified fine-weather area. Herein, description will continue assuming that the information processing device 300 has determined that the deployment of the mobile object 40 is not to be changed from the region in which the communication infrastructure 60 is installed.

The information processing device 300 controls the mobile object 40 and the flight vehicle 100 in order to establish a feeder link between the gateway 45 mounted on the mobile object 40 and the flight vehicle 100, in response to determining the deployment of the mobile object 40. The mobile object 40 and the flight vehicle 100 establish the feeder link according to control by the information processing device 300.

In response to the feeder link between the gateway 45 and the flight vehicle 100 being established, the information processing device 300 controls the flight vehicle 100 to switch access to the network 20 from that via the feeder link between the gateway 55 and the flight vehicle 100 to that via the feeder link between the gateway 45 and the flight vehicle 100. The flight vehicle 100 switches to access to the network 20 via the feeder link between the flight vehicle 100 and the gateway 45 according to control by the information processing device 300.

A beam having high directionality in the high frequency band is used for the feeder link between the flight vehicle providing wireless communication service and the gateway. The beam having high directionality in the high frequency band is suitable for high-speed communication, and is relatively less impacted by interference caused by another beam. However, the beam having high directionality in the high frequency band tends to be impacted by attenuation of the beam by water or the like, and tends to be impacted by shielding of the beam by obstacles such as airplane, a flock of birds or the like flying in the sky. Therefore, the feeder link using the beam having high directionality in the high frequency band may be disconnected due to the presence of rain clouds, obstacles or the like between the flight vehicle and the gateway. In particular, the feeder link using the beam having high directionality in the high frequency band is likely to be disconnected due to localized heavy rainfalls such as a squall, "guerilla rainstorm" or the like.

On the other hand, according to the example illustrated in FIG. 1, the information processing device 300 deploys the mobile object having the gateway mounted thereon in an area, among the ground area, in which the sky situation is good according to the sky situation above the ground area for which the flight vehicle 100 provides wireless communication service. The flight vehicle 100 establishes a feeder link with the gateway mounted on the mobile object deployed in an area in which the sky situation is good. By mounting the gateway on the mobile object and dynamically and flexibly determining the deployment of said mobile object according to the sky situation above the ground area, the number of gateways required to provide wireless communication service in which the feeder link is less impacted by the sky situation above the ground area can be reduced, as compared to a case where the gateway is installed on the ground. Further, by mounting the gateway on the mobile object, costs required to installed the gateway on the ground can be reduced, and the gateway can also be deployed in an area in which it is difficult to install the gateway on the ground. In this manner, according to the example illustrated in FIG. 1, wireless communication service in which the feeder link is less impacted by the sky situation above the ground area can be achieved at a low cost.

Figure 2:
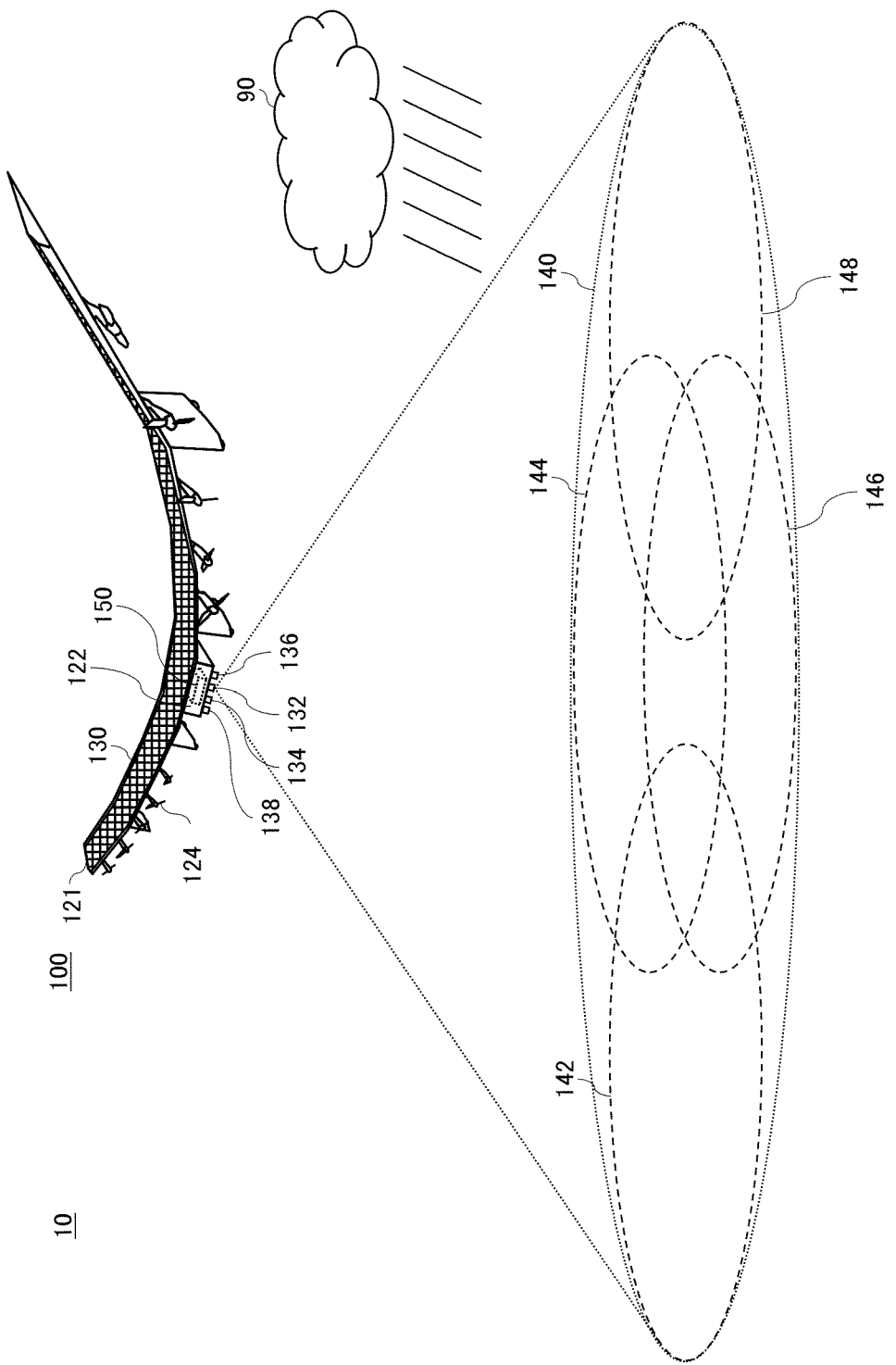
FIG. 2 schematically illustrates another example of a system 10.

FIG. 2 schematically illustrates another example of the system 10. In FIG. 2, an example in which the information processing device 150 switches the frequency of the SL beam according to the weather in the sky above the ground area for which the flight vehicle 100 provides wireless communication service is mainly described. Herein, description will be made assuming, as an initial state, a state where the SL antenna 132 is forming a wireless communication area 140 including a sub-cell 142, a sub-cell 144, a sub-cell 146, and a sub-cell 148 by radiating the SL beam in the millimeter wave band.

The information processing device 150 determines, based on the weather information in the sky above the ground area for which the flight vehicle 100 provides wireless communication service, whether four ground sub-areas each corresponding to the sub-cell 142, the sub-cell 144, the sub-cell 146, and the sub-cell 148 are fine-weather areas. Herein, description will continue assuming that the information processing device 150 has determined that three ground sub-areas each corresponding to the sub-cell 142, the sub-cell 144, and the sub-cell 146 where rain clouds do not exist in the sky are fine-weather areas, and the ground sub-area corresponding to the sub-cell 148 where rain clouds 90 exist in the sky is not a fine-weather area.

In response to determining that the ground sub-area corresponding to the sub-cell 148 is not a fine-weather area, the information processing device 150 controls the SL antenna 132 to switch the frequency of the SL beam radiated to the ground sub-area corresponding the sub-cell 148 from the millimeter wave band to the Sub6 band. The SL antenna 132 switches the frequency of the SL beam radiated to the ground sub-area corresponding to the sub-cell 148 from the millimeter wave band to the Sub6 band according to control by the information processing device 150.

After a predetermined period elapsed since the frequency of the SL beam radiated to the ground sub-area corresponding to the sub-cell 148 is switched from the millimeter wave band to the Sub6 band, the information processing device 150 determines whether the four ground sub-areas are fine-weather areas, again. Herein, description will continue assuming that the information processing device 150 has determined that, since the rain clouds 90 moved rightward during the predetermined period, the weather in the sky above the four ground sub-areas each corresponding to the sub-cell 142, the sub-cell 144, the sub-cell 146, and the sub-cell 148 are fine-weather area.

In response to determining the ground sub-area corresponding to the sub-cell 148 is a fine-weather area, the information processing device 150 controls the SL antenna 132 to switch the frequency of the SL beam radiated to the ground sub-area corresponding to the sub-cell 148 from the Sub6 wave band to the millimeter wave band. The SL antenna 132 switches the frequency of the SL beam radiated to the ground sub-area corresponding to the sub-cell 148 from the Sub6 band to the millimeter wave band according to control by the information processing device 150.

The communication rate of data communication using the SL beam in the millimeter wave band is faster compared to data communication using the SL beam in the Sub6 band. However, the SL beam in the millimeter wave band tends to be impacted by attenuation of the beam by water or the like, compared to the SL beam in the Sub6 band. Therefore, the service link using the SL beam in the millimeter wave band may be disconnected due to presence of rain clouds or the like. In particular, the service link using the SL beam in the millimeter wave band is likely to be disconnected due to localized heavy rain such as a squall, "guerilla rainstorms", or the like.

On the other hand, according to the example illustrated in FIG. 2, the information processing device 150 controls the SL antenna 132 such that the SL beam in the millimeter wave band is radiated when the ground area is a fine-weather area, and the SL beam in the Sub6 wave band is radiated when the ground area is not a fine-weather area. In this manner, in the system 10 as a whole, a high-quality and stable wireless communication service in which the service link is less likely to be impacted by the weather can be provided.

Note that, the information processing device 300 may switch the frequency of the SL beam according to the weather in the sky above the ground area for which the flight vehicle 100 provides wireless communication service. That is, the information processing device 300 may have a similar functionality as the information processing device 150.

Figure 3:
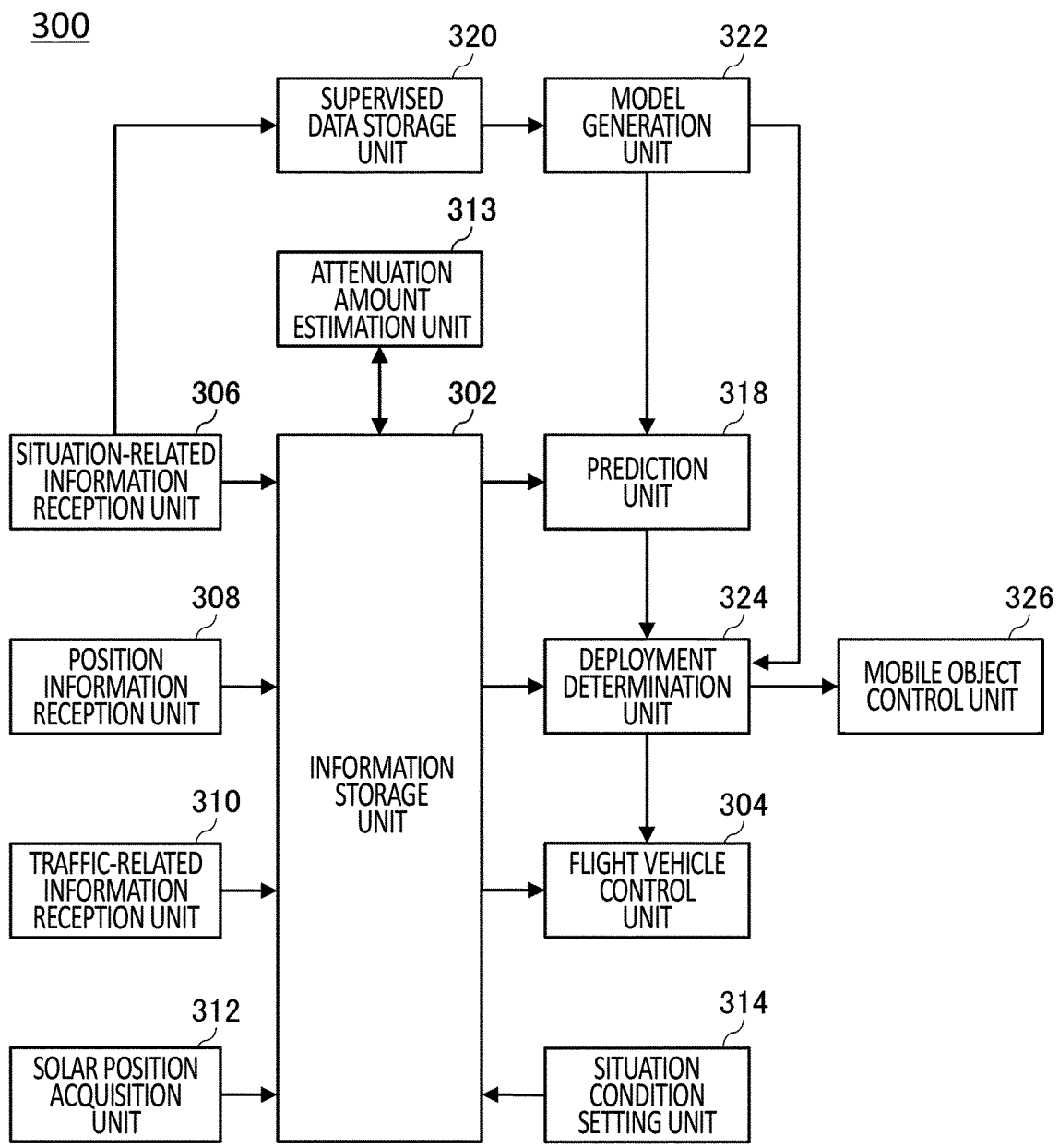
FIG. 3 schematically illustrates an example of functional configuration of an information processing device 300.

FIG. 3 schematically illustrates an example of functional configuration of the information processing device 300. The information processing device 300 has an information storage unit 302, a flight vehicle control unit 304, a situation-related information reception unit 306, a position information reception unit 308, a traffic-related information reception unit 310, a solar position acquisition unit 312, a situation condition setting unit 314, a prediction unit 318, a supervised data storage unit 320, a model generation unit 322, a deployment determination unit 324, and a mobile object control unit 326. Note that, the information processing device 300 does not necessarily have all of these components.

The information storage unit 302 is stores various types of information. The information storage unit 302 stores target position information indicating a target position of the flight vehicle 100 and flight path information indicating a flight path of the flight vehicle 100, for example. The target position is set in the sky above the ground area for which the flight vehicle 100 provides wireless communication service, for example. The target position information may indicate a three-dimensional position. The flight path information may indicate a flight path in which the flight vehicle 100 flies in a circling manner. The information storage unit 302 stores mobile object position information indicating a position of the mobile object, for example. The information storage unit 302 includes installation position information indicating an installation position of the gateway installed on the ground, for example. The information storage unit 302 stores communication infrastructure-related information related to a communication infrastructure, for example. The communication infrastructure-related information includes installation position information indicating an installation position of the communication infrastructure, for example. The communication infrastructure-related information may include information indicating whether the communication infrastructure includes a power supply unit. The information storage unit 302 may include installation position information of a power supply device.

The flight vehicle control unit 304 controls a flight vehicle 100. The flight vehicle control unit 304 controls a flight control device mounted on the flight vehicle 100, for example. The flight vehicle control unit 304 controls the flight control device such that the flight vehicle 100 moves to the target position indicated by the target position information of the flight vehicle 100 that is stored in the information storage unit 302, and flies along the flight path indicated by the flight path information of the flight vehicle 100 that is stored in the information storage unit 302, for example.

The flight vehicle control unit 304 controls an antenna mounted on the flight vehicle 100, for example. The flight vehicle control unit 304 controls the SL antenna 132, for example. The flight vehicle control unit 304 controls the FL antenna 134, for example. The flight vehicle control unit 304 controls the FL antenna 136, for example. The flight vehicle control unit 304 may control the satellite communication antenna 138. The flight vehicle control unit 304 may be an example of the antenna control unit.

The flight vehicle control unit 304 controls the flight vehicle 100 by transmitting flight vehicle control information for controlling the flight vehicle 100 to the flight vehicle 100, for example. The flight vehicle control unit 304 transmits the flight vehicle control information to the flight vehicle 100 via the feeder link established between the flight vehicle 100 and the gateway, for example. The flight vehicle control unit 304 may transmit the flight vehicle control information to the flight vehicle 100 via the communication satellite 30.

The situation-related information reception unit 306 receives the situation-related information related to the sky situation above the ground area for which the flight vehicle 100 provides wireless communication service. The situation-related information reception unit 306 receives the situation-related information from the flight vehicle 100, for example. The situation-related information reception unit 306 receives the situation-related information from the mobile object, for example. The situation-related information reception unit 306 receives the situation-related information from a meteorological observation device installed in the ground area, for example. The situation-related information reception unit 306 may receive the situation-related information from an external device such as a weather information management server or a flight path management server that manages the flight path of an airplane. The situation-related information reception unit 306 stores the situation-related information received in the information storage unit 302.

The situation-related information includes weather-related information related to the weather in the sky above the ground area, for example. The weather-related information includes weather information indicating the weather in the sky above the ground area, for example. The weather information includes cloud region information indicating a region in which clouds are developed, for example. The weather information includes fog region information indicating a region in which fog is developed, for example. The weather information includes mist region information indicating a region in which mist is generated, for example. The weather information includes atmospheric disturbance region information indicating a region in which atmospheric disturbance has occurred, for example. The weather information includes turbulence region information indicating a region in which atmospheric turbulence has occurred. The weather information includes cloud amount information indicating the cloud amount, which is the ratio of clouds in a space of a predetermined range, for example. The weather information includes rainfall amount information indicating a rainfall amount to the ground area from the sky, for example. The weather information includes predicted rainfall amount information indicating a predicted rainfall amount to the ground area from the sky, for example. The weather information includes snowfall amount information indicating a snowfall amount to the ground area from the sky, for example. The weather information includes predicted snowfall amount information indicating a predicted snowfall amount to the ground area from the sky, for example. The weather information includes cloud base altitude information indicating the cloud base altitude, for example. The weather information includes cloud thickness information indicating the thickness of clouds. The weather information includes wind velocity information indicating the wind velocity, for example. The weather information includes wind direction information indicating the wind direction, for example. The weather information includes temperature information indicating the temperature, for example. The weather information includes humidity information indicating the humidity, for example. The weather information includes atmospheric pressure information indicating the atmospheric pressure, for example. The weather information includes extinction coefficient information indicating the extinction coefficient of the atmosphere. The weather information may include light transmittance information indicating the light transmittance of the atmosphere.

The weather-related information includes a captured image of the ground area captured by the image capturing device mounted on the flight vehicle 100, for example. The weather-related information may include a captured image of the sky above the ground area captured by the image capturing device mounted on the meteorological observation device installed in the mobile object or the ground area.

The situation-related information includes estimated attenuation amount information indicating an estimated attenuation amount of the beam radiated from the flight vehicle 100 by the time it reaches the ground, for example. The estimated attenuation amount includes an estimated attenuation amount of the FL beam radiated from the flight vehicle 100 by the time it reaches the ground, for example. The estimated attenuation amount includes an estimated attenuation amount of the SL beam radiated from the flight vehicle 100 by the time it reaches the ground, for example. The situation-related information may include the flight path information.

The position information reception unit 308 receives position information. The position information reception unit 308 receives mobile object position information, for example. The position information reception unit 308 receives flight position information, for example. The position information reception unit 308 stores the received position information in the information storage unit 302.

The traffic-related information reception unit 310 receives traffic situation-related information related to the traffic condition in the ground area. The traffic-related information reception unit 310 receives the traffic situation-related information from a traffic situation-related information management server that manages the traffic situation-related information, for example. The traffic-related information reception unit 310 stores the received traffic situation-related information in the information storage unit 302.

The traffic situation-related information includes traffic jam situation information indicating a traffic jam situation on the road, for example. The traffic situation-related information may include traffic regulation situation information indicating a traffic regulation situation on the road.

The solar position acquisition unit 312 acquires solar position information indicating the solar position represented by solar altitude and solar azimuth in the ground area. The solar position acquisition unit 312 acquires the solar position information by receiving the solar position information from the external device, for example. The solar position acquisition unit 312 may acquire the solar position information by calculating the solar position based on longitude information and latitude information of the ground area. The solar position acquisition unit 312 stores the acquired solar position information in the information storage unit 302.

The attenuation amount estimation unit 313 estimates the attenuation amount of the beam radiated from the flight vehicle 100 by the time it reaches the ground. The attenuation amount estimation unit 313 estimates the attenuation amount of the FL beam radiated from the flight vehicle 100 by the time it reaches the ground, for example. The attenuation amount estimation unit 313 estimates the attenuation amount of the SL beam radiated from the flight vehicle 100 by the time it reaches the ground, for example. The attenuation amount estimation unit 313 stores the estimated attenuation amount in the information storage unit 302 as the estimated attenuation amount information.

The attenuation amount estimation unit 313 estimates the attenuation amount of the beam radiated from the flight vehicle 100 by the time it reaches the ground, based on the frequency of the beam radiated from the flight vehicle 100 and the flight position of the flight vehicle 100 indicated by the flight position information that is stored in the information storage unit 302, for example. The attenuation amount estimation unit 313 may estimate the attenuation amount of the beam radiated from the flight vehicle 100 by the time it reaches the ground, further based on the weather information that is stored in the information storage unit 302. For example, the attenuation amount estimation unit 313 estimates the attenuation amount of the beam radiated from the flight vehicle 100 by the time it reaches the ground by estimating, based on the thickness of clouds indicated by the cloud thickness information included in the weather information, the attenuation amount of the beam when it passes through said clouds.

The situation condition setting unit 314 sets a situation condition, which is a condition to identify an area in which the sky situation above the ground area is good. The situation condition setting unit 314 sets the situation condition by receiving the situation condition from a communication terminal owned by a user of the information processing device 300, for example. The situation condition setting unit 314 may set the situation condition by accepting an input by the user of the information processing device 300 by using an input device included in the information processing device 300. The situation condition setting unit 314 stores the set situation condition in the information storage unit 302.

The situation condition includes a weather condition, which is a condition to identify a fine-weather area among the ground area, for example. The weather condition includes that the cloud amount is less than a predetermined cloud amount threshold, for example. The weather condition includes that the rainfall amount is less than a predetermined rainfall amount threshold, for example. The weather condition includes that the predicted rainfall amount is less than a predetermined predicted rainfall threshold, for example. The weather condition includes that the snowfall amount is less than a predetermined snowfall amount threshold, for example. The weather condition includes that the predicted snowfall amount is less than a predetermined predicted snowfall amount threshold, for example. The weather condition includes that a fog is not developed, for example. The weather condition includes that mist is not generated, for example. The weather condition includes that atmospheric disturbance has not occurred, for example. The weather condition may include that atmospheric turbulence has not occurred.

The situation condition include that the estimated attenuation amount of the FL beam is less than a predetermined FL beam attenuation amount threshold, for example. The situation condition includes that the estimated attenuation amount of the SL beam is less than a predetermined SL beam attenuation amount threshold, for example. The situation condition may include that a flight path of an airplane is not included. The situation condition may include that, when establishing a feeder link through optical wireless communication, when the gateway is directed toward the flight vehicle 100, said gateway does not face the sun.

The prediction unit 318 predicts variation in the weather in the sky above the ground area. The prediction unit 318 predicts variation in the weather in the sky above the ground area based on the weather-related information that is stored in the information storage unit 302, for example.

The prediction unit 318 predicts whether the variation in the weather in the sky above the ground area has an adverse impact on the feeder link that is established between the gateway and the flight vehicle 100, based on the prediction result of the variation in the weather in the sky above the ground area, for example. When it is predicted that the weather between the gateway and the flight vehicle 100 will not meet the weather condition within a predetermined period, the prediction unit 318 predicts that the variation in the weather in the sky above the ground area has an adverse impact on said feeder link, for example.

The supervised data storage unit 320 stores supervised data. The supervised data storage unit 320 stores the captured image of the ground area captured by the image capturing device mounted on the flight vehicle 100 that is received by the situation-related information reception unit 306 and weather information indicating the weather in the sky above the ground area after a predetermined period has elapsed since the captured time of said captured image, in association with each other, for example.

The model generation unit 322 generates, by means of machine learning, an estimation model for estimating, from a captured image received by the situation-related information reception unit 306 from the flight vehicle 100, the weather in the sky above the ground area after a predetermined period has elapsed since the captured time of said captured image by using, as supervised data, a plurality of captured images that are stored in the supervised data storage unit 320 and the weather information after a predetermined period has elapsed since the captured time of said captured image. The model generation unit 322 generates the estimation model by using the plurality of captured images of the ground area captured by the flight vehicle 100 in the past and the weather information after a predetermined period has elapsed since the captured time of said captured image, for example. The supervised data storage unit 320 stores the position and size of clouds included in the captured image and the position and range of rainfall area on the ground where it rained after a predetermined period has elapsed since the captured time of said captured image, in association with each other, for example. The corresponding relationship between the position and size of clouds included in the captured image and the position and range of the rainfall area on the ground where it rained after a predetermined period has elapsed since the captured time of the said captured image may be registered by a user of the information processing device 300. The model generation unit 322 may generate an estimation model that is capable of estimating, from the position and size of clouds included in the captured image received by the situation-related information reception unit 306 from the flight vehicle 100, the position and range of the rainfall area on the ground where it rained after a predetermined period has elapsed since the captured time of said captured image. The prediction unit 318 may predict, by using the estimation model generated by the model generation unit 322, the variation in the weather in the sky above the ground area by estimating the weather in the sky above the ground area from the captured image received by the situation-related information reception unit 306 from the flight vehicle 100.

The deployment determination unit 324 determines the deployment of the mobile object. The deployment determination unit 324 determines the deployment of the mobile object in order to maintain the state in which a feeder link is established by the flight vehicle 100, for example. The deployment determination unit 324 determines the deployment of the mobile object in order to maintain the state in which two feeder links are established by the flight vehicle 100, for example.

The deployment determination unit 324 determines the deployment of the mobile object when it is predicted by the prediction unit 318 that the variation in the weather in the sky above the ground area has an adverse impact on the feeder link that is established between the gateway and the flight vehicle 100, for example. The deployment determination unit 324 determines the deployment of the mobile object when it is predicted by the prediction unit 318 that the variation in the weather in the sky above the ground area has an adverse impact on at least either one of the two feeder links that are established between each of the two gateways and the flight vehicle 100, for example.

The deployment determination unit 324 determines the deployment of the mobile object mounted on the gateway for which a feeder link is not established with the flight vehicle 100, in order to establish a feeder link between the gateway mounted on the mobile object and the flight vehicle 100, for example. When a plurality of mobile objects mounted on the gateway for which a feeder link is not established with the flight vehicle 100 exists, for example, the deployment determination unit 324 selects a mobile object among said plurality of mobile objects.

The deployment determination unit 324 selects the mobile object based on the situation-related information and the mobile object position information that are stored in the information storage unit 302, for example. The deployment determination unit 324 preferentially selects a mobile object deployed in an area that meets the situation condition that is stored in the information storage unit 302, for example. The deployment determination unit 324 preferentially selects a mobile object deployed in an area that meets the weather condition, for example.

The deployment determination unit 324 preferentially selects a mobile object having a shorter moving distance to an area that meets the situation condition, for example. The deployment determination unit 324 preferentially selects a mobile object having a shorter moving distance to an area that meets the weather condition, for example.

The deployment determination unit 324 selects the mobile object further based on the traffic situation-related information, for example. The deployment determination unit 324 preferentially selects a mobile object having a shorter moving time to an area that meets the situation condition, for example. The deployment determination unit 324 preferentially selects a mobile object having a shorter moving time to an area that meets the weather condition, for example.

The deployment determination unit 324 determines the deployment of the mobile object based on the situation-related information, for example. The deployment determination unit 324 determines to deploy the mobile object in an area that meets the situation condition, for example.

The deployment determination unit 324 determines the deployment of the mobile object based on the weather-related information, for example. The deployment determination unit 324 determines to deploy the mobile object in an area that meets the weather condition, for example.

The deployment determination unit 324 determines the deployment of the mobile object based on the flight path information that is stored in the information storage unit 302, for example. The deployment determination unit 324 determines to deploy the mobile object in an area in which the flight path indicated by the flight path information is not included between the gateway mounted on the mobile object and the flight vehicle 100 when the mobile object is deployed, for example.

The deployment determination unit 324 may determine the deployment of the mobile object based on the solar position information that is stored in the information storage unit 302 in order to establish a feeder link through optical wireless communication. When the mobile object is deployed and the gateway mounted on the mobile object is directed toward the flight vehicle 100, the deployment determination unit 324 may determine the deployment of the mobile object to an area in which said gateway does not face the sun, for example.

The deployment determination unit 324 determines the deployment of the mobile object based on the weather in the sky above the ground area predicted based on the weather-related information, for example. The deployment determination unit 324 determines to deploy the mobile object in an area predicted to meet the weather condition during the predetermined period, for example.

The deployment determination unit 324 determines the deployment of the mobile object based on the estimation result obtained by estimating, from the captured image received by the situation-related information reception unit 306 from the flight vehicle 100, the weather in the sky above the ground area by using the estimation model generated by the model generation unit 322, for example. The deployment determination unit 324 determines to deploy the mobile object in an area estimated to meet the weather condition during the predetermined period, for example.

The deployment determination unit 324 preferentially deploys the mobile object in a region, among the area that meets the situation condition, having a shorter moving distance of the mobile object, based on the mobile object position information, for example. The deployment determination unit 324 preferentially deploys the mobile object in a region, among the area that meets the weather condition, having a shorter moving distance of the mobile object, based on the mobile object position information, for example.

The deployment determination unit 324 preferentially deploys the mobile object in a region, among the area that meets the situation condition, having a shorter moving time of the mobile object, based on the mobile object position information and the traffic situation-related information, for example. The deployment determination unit 324 preferentially deploys the mobile object in a region, among the area that meets the weather condition, having a shorter moving time of the mobile object, based on the mobile object position information and the traffic situation-related information, for example.

The deployment determination unit 324 preferentially deploys the mobile object in a region, among the area that meets the weather condition, that is predicted to meet the weather condition for a longer period, based on the weather in the sky above the ground area predicted based on the weather-related information, for example. The deployment determination unit 324 preferentially deploys the mobile object in a region, among the area that meets the weather condition, that is estimated to meet the weather condition for a longer period, based on the estimation result obtained by estimating, from the captured image received by the situation-related information reception unit 306 from the flight vehicle 100, the weather in the sky above the ground area by using the estimation model generated by the model generation unit 322, for example.

The deployment determination unit 324 preferentially deploys the mobile object in a region, among the area that meets the situation condition, in which the communication infrastructure is installed, based on the installation position information of the communication infrastructure included in the communication infrastructure-related information that is stored in the information storage unit 302, for example. The deployment determination unit 324 preferentially deploys the mobile object in a region, among the area that meets the weather condition, in which the communication infrastructure is installed, based on the installation position information of the information communication infrastructure. The deployment determination unit 324 may preferentially deploy the mobile object in a region, among the region in which the communication infrastructure is installed, in which a communication infrastructure including the power supply unit is installed, based on information indicating whether the communication infrastructure includes a power supply unit, that is included in the communication infrastructure-related information.

The deployment determination unit 324 may determine the deployment of the flight vehicle 100. The deployment determination unit 324 determines the deployment of the flight vehicle 100 such that, in the determined deployment of the mobile object, the flight vehicle 100 can establish a feeder link with the gateway mounted on said mobile object, for example. The deployment determination unit 324 determines the deployment of the flight vehicle 100 based on the flight position of the flight vehicle 100 indicated by the flight position information of the flight vehicle 100 and the deployment destination information indicating the position of the deployment destination of the mobile object, for example.

The mobile object control unit 326 controls the mobile object. The mobile object control unit 326 controls the mobile object such that the mobile object moves to the deployment destination in response to the deployment determination unit 324 determining the deployment of the mobile object, for example. The mobile object control unit 326 controls the mobile object such that the mobile object moves to the deployment destination by transmitting, to the mobile object, mobile object control information for controlling the mobile object, for example. The mobile object control unit 326 controls the mobile object such that the mobile object moves to the deployment destination by transmitting deployment destination information to the mobile object, for example. In this case, the mobile object that received the deployment destination information autonomously moves to the deployment destination. The mobile object control unit 326 may control the mobile object such that the mobile object moves to the deployment destination by transmitting the deployment destination information the deployment destination information to a communication terminal owned by the driver who is driving the mobile object. In this case, the driver of the mobile object who checked the deployment destination information received by the communication terminal may drive the mobile object to deploy the mobile object at the deployment destination.

The mobile object control unit 326 may control the mobile object to establish a feeder link between the gateway mounted on the mobile object and the flight vehicle 100, in response to the mobile object having moved to the deployment destination. The flight vehicle control unit 304 may control the flight vehicle 100 to establish said feeder link, in response to the mobile object having moved to the deployment destination. The flight vehicle control unit 304 may control the flight vehicle 100 to switch the access to the network 20 to that via said feeder link, in response to establishing said feeder link.

When an area that meets the situation condition does not exist, the flight vehicle control unit 304 may control the FL antenna 134 to lower the frequency of the FL beam radiated by the FL antenna 134 to said gateway by the when in order to establish the feeder link between the gateway mounted on the mobile object and the flight vehicle. When an area that meets the weather condition does not exist, the flight vehicle control unit 304 may control the FL antenna 134 to lower the frequency of the FL beam radiated to said gateway by the FL antenna 134 in order to establish the feeder link between said gateway and the flight vehicle.

The flight vehicle control unit 304 may control the SL antenna to switch the frequency of the SL beam from the millimeter wave band to the Sub6 band, when an area that meets the situation condition does not exist. The flight vehicle control unit 304 may control the SL antenna to switch the frequency of the SL beam from the millimeter wave band to the Sub6 band, when an area that meets the weather condition does not exist.

The deployment determination unit 324 may determine the deployment of the mobile object mounted on the gateway that has a feeder link established with the flight vehicle 100. When said mobile object moves by a distance that is shorter than a predetermined distance, thereby allowing the adverse impact on said feeder link predicted by the prediction unit 318 to be avoided, for example, the deployment determination unit 324 determines the deployment of said mobile object. In this case, the mobile object control unit 326 may control the mobile object to maintain said feeder link during the movement of said mobile object. The flight vehicle control unit 304 may control the flight vehicle to maintain said feeder link during the movement of said mobile object.

Figure 4:
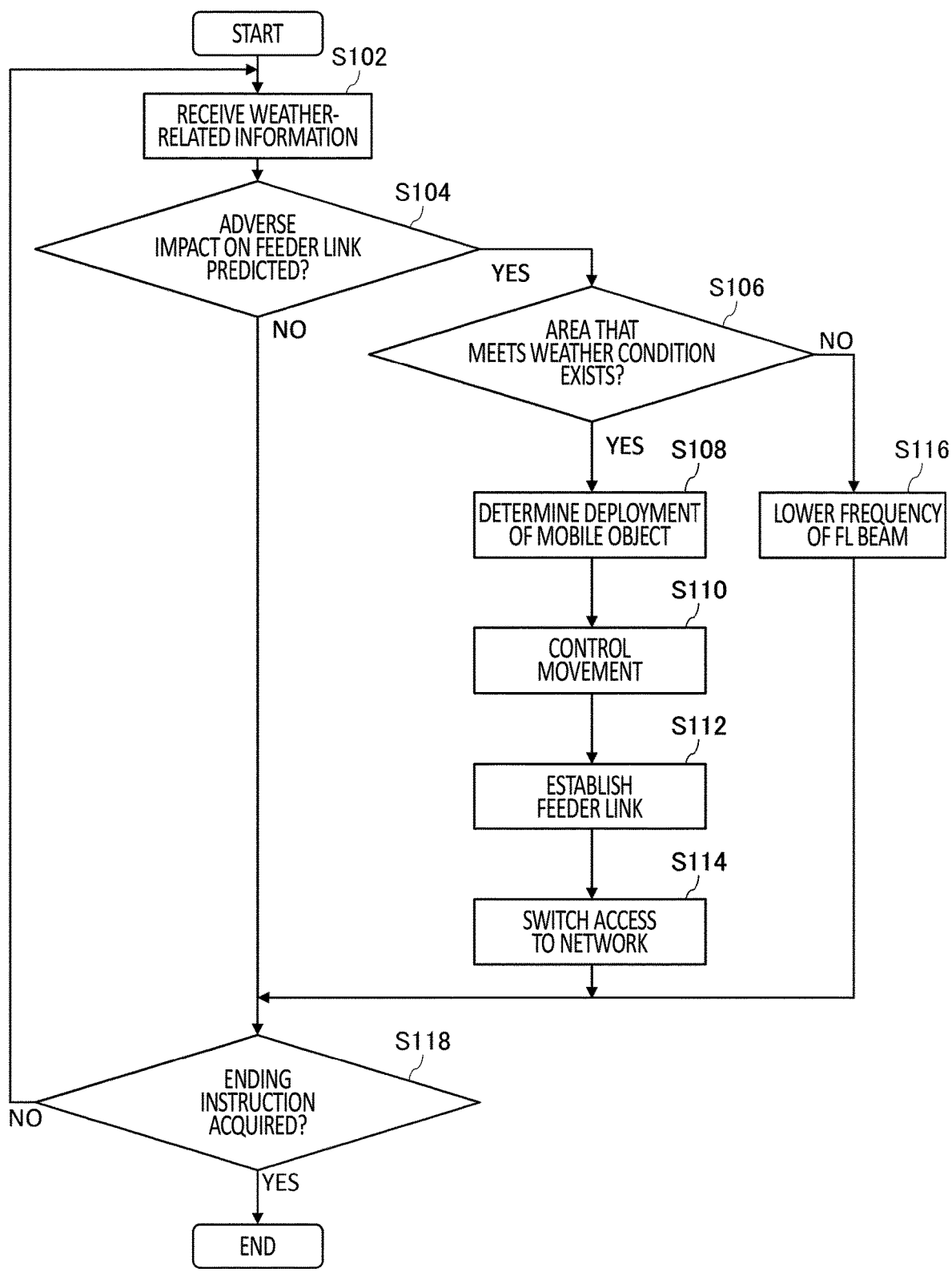
FIG. 4 is an illustration to describe an example of a processing flow of the information processing device 300.

FIG. 4 is an illustration to describe an example of a processing flow of the information processing device 300. In FIG. 4, a state in which a feeder link is established with the gateway by the flight vehicle 100 is described as the initial state.

At step (steps may be described as S in short) 102, the situation-related information reception unit 306 receives weather-related information. At S104, the prediction unit 318 predicts variation in the weather in the sky above the ground area for which the flight vehicle 100 provides wireless communication service based on the weather-related information received by the situation-related information reception unit 306 at S102. The prediction unit 318 predicts whether the variation in the weather in the sky above the ground area has an adverse impact on the feeder link that is established between the gateway and the flight vehicle 100, based on the prediction result of the variation in the weather in the sky above the ground area. When it is predicted by the prediction unit 318 that the variation in the weather in the sky above the ground area has an adverse impact on said feeder link, the process proceeds to S106. When it is predicted by the prediction unit 318 that the variation in the weather in the sky above the ground area does not have an adverse impact on said feeder link, the process proceeds to S118.

At S106, the deployment determination unit 324 identifies whether an area that meets the weather condition exists, based on the weather-related information received by the situation-related information reception unit 306 at S102. When it is identified by the deployment determination unit 324 that an area that meets the weather condition exists, the process proceeds to S108. When it is identified by the deployment determination unit 324 that an area that meets the weather condition does not exist, the process proceeds to S116.

At S108, the deployment determination unit 324 determines to deploy said mobile object in the area that meets the weather condition identified by the deployment determination unit 324 at S106, in order to establish an feeder link between the gateway mounted on the mobile object and the flight vehicle 100. At S110, the mobile object control unit 326 controls the mobile object such that the mobile object moves to the deployment destination determined by the deployment determination unit 324 at S108. At S112, the mobile object control unit 326 and the flight vehicle control unit 304 control the mobile object and the flight vehicle 100, respectively, in order to establish the feeder link between the gateway mounted on the mobile object and the flight vehicle 100, in response to the mobile object having moved to the deployment destination. At S114, the flight vehicle control unit 304 controls the flight vehicle 100 to switch the access to the network 20 to that via said feeder link, in response to said feeder link being established.

At S116, the flight vehicle control unit 304 controls the FL antenna 134 to lower the frequency of the FL beam radiated by the FL antenna 134 to the gateway mounted on the mobile object. The flight vehicle control unit 304 controls the FL antenna 134 to switch from optical wireless communication to radio-wave wireless communication, for example. The flight vehicle control unit 304 may control the FL antenna 134 to switch the frequency of the FL beam from the millimeter wave band to the microwave band.

At S118, the information processing device 300 determines whether an ending instruction has been acquired. The information processing device 300 acquires the ending instruction by receiving the ending instruction from the communication terminal owned by a user of the information processing device 300, for example. The information processing device 300 may acquire the ending instruction by accepting an input by a user of the information processing device 300 by using an input device included in the information processing device 300. When an ending instruction has not been acquired by the information processing device 300, the process returns to S102. When an ending instruction has been acquired by the information processing device 150, the process ends.

In the flow of the processing illustrated in FIG. 4, S106 and S108 may be replaced by determining, by the deployment determination unit 324, the deployment of the mobile object based on the weather-related information received by the situation-related information reception unit 306 at S102, and identifying whether the determined deployment destination of the mobile object is an area that meets the weather condition. In this case, when the deployment destination of the mobile object determined by the deployment determination unit 324 is an area that meets the weather condition, the process proceeds to S110, and when the deployment destination of the mobile object determined by the deployment determination unit 324 is an area that does not meet the weather condition, the process proceeds to S116.

In the flow of the processing illustrated in FIG. 4, S116 may be replaced by establishing, by the flight vehicle control unit 304, wireless communication connection between the flight vehicle 100 and another flight vehicle 100, and controlling each of the flight vehicle 100 and another flight vehicle 100 to switch the access to the network 20 to that via said wireless communication connection. In the flow of the processing illustrated in FIG. 4, when the feeder link between the gateway mounted on the mobile object and the flight vehicle 100 is established at S112 after lowering the frequency of the FL beam radiated to the gateway mounted on the mobile object at S116, said feeder link may be established after returning the frequency of the FL beam to the original frequency.

Figure 5:
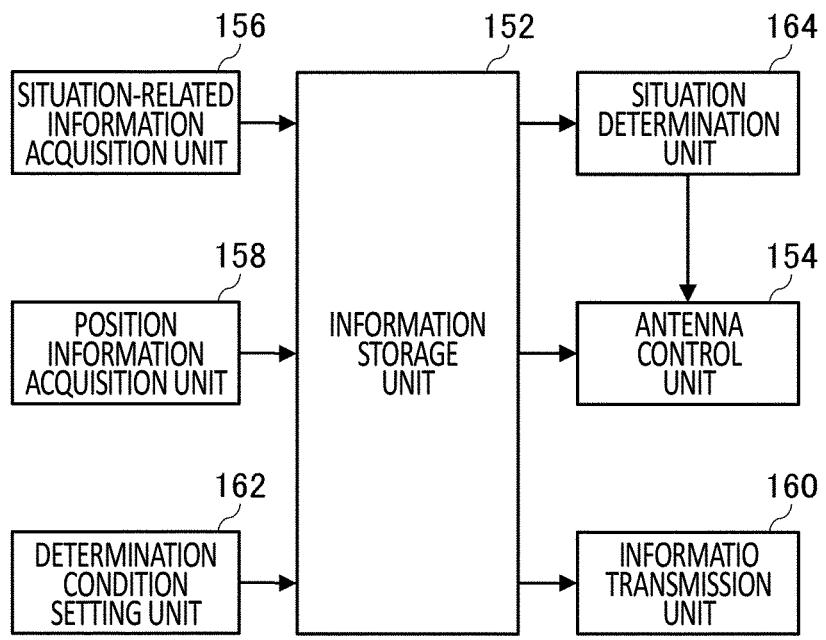
FIG. 5 schematically illustrates an example of functional configuration of an information processing device 150.

FIG. 5 schematically illustrates an example of functional configuration of the information processing device 150. The information processing device 150 has an information storage unit 152, an antenna control unit 154, a situation-related information acquisition unit 156, a position information acquisition unit 158, an information transmission unit 160, a determination condition setting unit 162, and a situation determination unit 164. Note that, the information processing device 150 does not necessarily have all of these components.

The information storage unit 152 stores various types of information. The information storage unit 152 stores target position information and flight path information, for example. The information storage unit 152 stores mobile object position information, for example. The information storage unit 152 may include installation position information of the gateway installed on the ground, for example.

The antenna control unit 154 controls an antenna mounted on the flight vehicle 100. The antenna control unit 154 controls an SL antenna 132, for example. The antenna control unit 154 controls the SL antenna 132 to radiate an SL beam in the millimeter wave band, for example. The antenna control unit 154 controls the SL antenna 132 to radiate an SL beam in the Sub6 band, for example.

The antenna control unit 154 controls an FL antenna, for example. The antenna control unit 154 controls an FL antenna 134, for example. The antenna control unit 154 controls an FL antenna 136, for example.

The antenna control unit 154 controls the FL antenna to establish a feeder link with a gateway mounted on the mobile object, for example. The antenna control unit 154 may control the FL antenna to establish the feeder link with the gateway installed on the ground.

The antenna control unit 154 controls the FL antenna to establish the feeder link with the gateway through radiowave wireless communication, for example. The antenna control unit 154 controls the FL antenna to establish the feeder link with the gateway with an FL beam of a frequency in the microwave band, for example. The antenna control unit 154 controls the FL antenna to establish the feeder link with the gateway with an FL beam of a frequency in the millimeter wave band, for example. The antenna control unit 154 may control the FL antenna to establish the feeder link with the gateway through optical wireless communication. The antenna control unit 154 controls the FL antenna to establish the feeder link with the gateway with an FL beam of a frequency in infrared light band, for example. The antenna control unit 154 may control the FL antenna to establish wireless communication connection with another flight vehicle 100.

The antenna control unit 154 may control the satellite communication antenna 138. The antenna control unit 154 controls the satellite communication antenna 138 to communicate with the communication satellite 30, for example.

The situation-related information acquisition unit 156 acquires situation-related information. The situation-related information acquisition unit 156 acquires the situation-related information by observing the weather information by a meteorological observation device mounted on the flight vehicle 100, for example. The situation-related information acquisition unit 156 acquires a captured image of the ground area captured by the image capturing device mounted on the flight vehicle 100, for example. The situation-related information acquisition unit 156 may acquire the situation-related information by receiving the situation-related information. The situation-related information acquisition unit 156 receives the situation-related information from the mobile object, for example. The situation-related information acquisition unit 156 receives the situation-related information from the meteorological observation device installed in the ground area, for example. The situation-related information acquisition unit 156 may receive, via a base station device, the situation-related information from an external device such as a weather information management server or a flight path management server of an airplane. The situation-related information acquisition unit 156 stores the acquired situation-related information in the information storage unit 152.

The position information acquisition unit 158 acquires position information. The position information acquisition unit 158 acquires flight position information of the flight vehicle 100, for example. The position information acquisition unit 158 may receive the Mobile object position information via the base station device. The position information acquisition unit 158 stores the acquired position information in the information storage unit 152.

The information transmission unit 160 transmits various types of information via the base station device. The information transmission unit 160 transmits various types of information to the information processing device 300, for example. The information transmission unit 160 may transmit various types of information to the mobile object.

The information transmission unit 160 transmits various types of information via the gateway mounted on the mobile object, for example. The information transmission unit 160 transmits various types of information via the gateway installed on the ground, for example. The information transmission unit 160 may transmit various types of information via the communication satellite 30.

The information transmission unit 160 transmits information acquired by the situation-related information acquisition unit 156, for example. The information transmission unit 160 transmits information acquired by the position information acquisition unit 158, for example.

The determination condition setting unit 162 sets a determination condition, which is a condition to determine a sky situation above the ground area for which the flight vehicle 100 provides wireless communication service. The determination condition setting unit 162 sets the determination condition by receiving the determination condition from a communication terminal owned by a user of the flight vehicle 100, for example. The determination condition setting unit 162 may set the determination condition by accepting an input by the user of the flight vehicle 100 by using an input device included in the flight vehicle 100. The determination condition setting unit 162 stores the set determination condition in the information storage unit 152.

The determination condition includes that the sky situation above the ground area meets the situation condition, for example. The determination condition includes that the ratio of the area, among the ground area, in which the sky situation meets the situation condition is higher than a predetermined ratio, for example. The determination condition includes that the weather in the sky above the ground area meets the weather condition, for example. The determination condition includes that the ratio of the area, among the ground area, in which the weather in the sky meets the weather condition is higher than a predetermined ratio, for example.

The determination condition may include a condition to determine a sky situation above a ground sub-area corresponding to a sub-cell that constitutes the wireless communication area 140. The determination condition includes that the sky situation of the ground sub-area meets the situation condition, for example. The determination condition includes that the ratio of the area, among the ground sub-area, in which the sky situation meets the situation condition is higher than a predetermined ratio, for example. The determination condition includes that the weather in the sky above the ground sub-area meets the weather condition, for example. The determination condition includes that the ratio of the area, among the ground sub-area, in which the weather in the sky meets the weather condition is higher than a predetermined ratio, for example.

The situation determination unit 164 determines the sky situation above the ground area. The situation determination unit 164 determines whether the sky situation above the ground area meets the determination condition that is stored in the information storage unit 152, based on the situation-related information that is stored in the information storage unit 152, for example. The situation determination unit 164 determines whether the sky situation above the ground area meets the determination condition based on the weather-related information that is stored in the information storage unit 152, for example.

The situation determination unit 164 determines the sky situation above the ground area by determining the sky situation above a plurality of ground sub-areas each corresponding to a plurality of sub-cells that constitute the wireless communication area 140, for example. The situation determination unit 164 determines whether the sky situation above the plurality of ground sub-areas each corresponding to the plurality of sub-cells that constitute the wireless communication area 140 meet the determination condition, for example.

In a case where the SL beam in the millimeter wave band is radiated from the SL antenna 132 to the ground area, for example, the antenna control unit 154 controls the SL antenna 132 to switch the frequency of the SL beam from the millimeter wave band to the Sub6 band when it is determined by the situation determination unit 164 that the situation in the ground area does not meet the determination condition. In a case where the SL beam in the Sub6 band is radiated from the SL antenna 132 to the ground area, for example, the antenna control unit 154 controls the SL antenna 132 to switch the frequency of the SL beam from the Sub6 band to the millimeter wave band when it is determined by the situation determination unit 164 that the situation in the ground area meets the determination condition.

In a case where a plurality of SL beams in the millimeter wave band is radiated from the SL antenna 132 to a plurality of ground sub-areas, for example, for any of the plurality of ground sub-areas, when it is determined by the situation determination unit 164 that the sky situation does not meet the determination condition, the antenna control unit 154 controls the SL antenna 132 to switch the frequency of the SL beams radiated to the ground sub-areas determined not to meet the determination condition from the millimeter wave band to the Sub6 band.

In a case where a plurality of SL beams in the Sub6 band is radiated from the SL antenna 132 to a plurality of ground sub-areas, for example, for any of the plurality of ground sub-areas, when it is determined by the situation determination unit 164 that the sky situation meets the determination condition, the antenna control unit 154 controls the SL antenna 132 to switch the frequency of the SL beams radiated to the ground sub-areas determined to meet the determination condition from the Sub6 band to the millimeter wave band.

Figure 6:
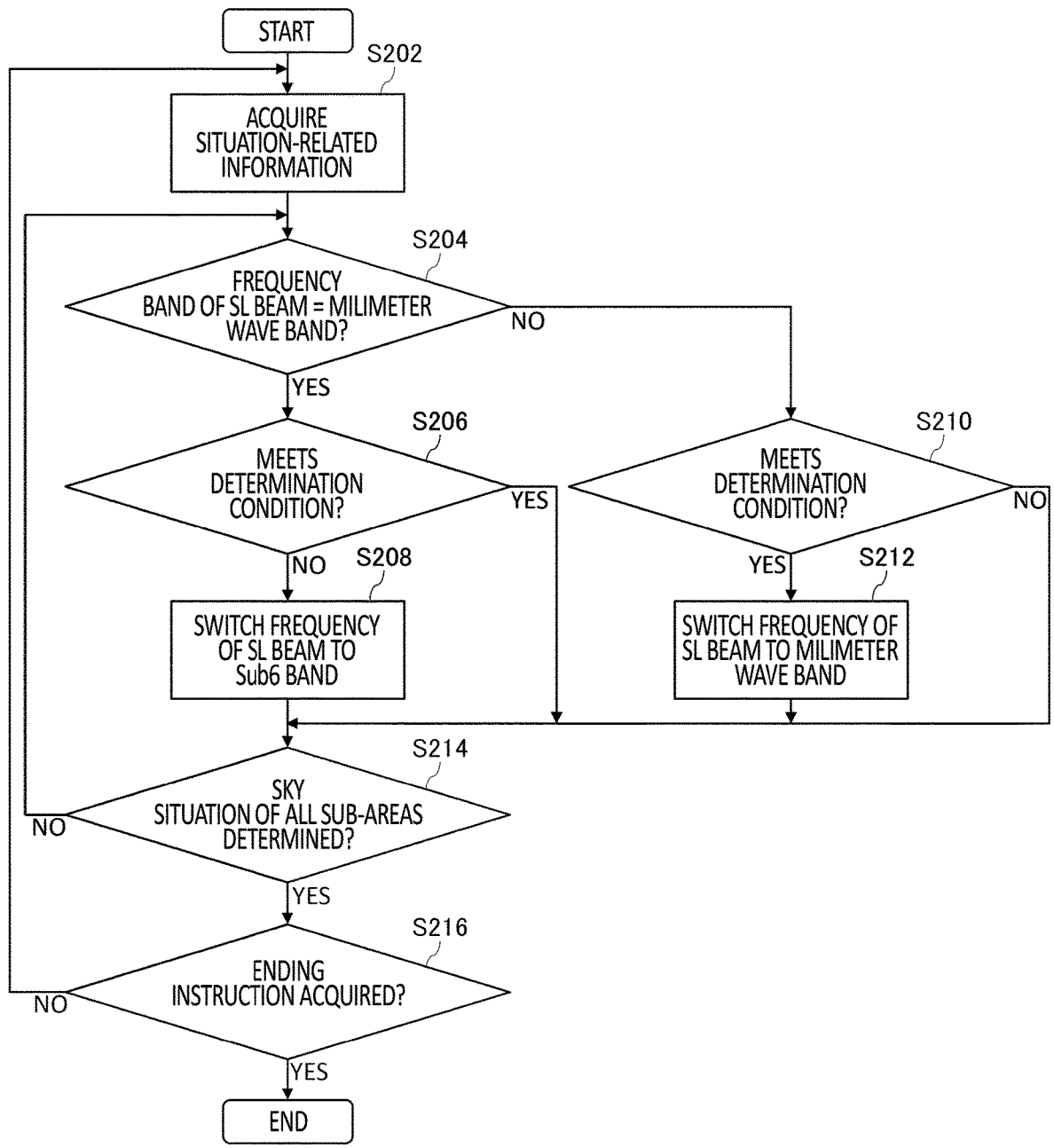
FIG. 6 is an illustration to describe an example of a processing flow of the information processing device 150.

FIG. 6 is an illustration to describe an example of a processing flow of the information processing device 150. In FIG. 6, a state in which a plurality of SL beams are radiated from the SL antenna 132 to a plurality of ground sub-areas is described as the initial state.

At S202, the situation-related information acquisition unit 156 acquires situation-related information. At S204, the antenna control unit 154 determines whether the frequency of the SL beam radiated to one sub-area among the plurality of ground sub-areas is in the millimeter wave band. When the frequency of the SL beam is in the millimeter wave band, the process proceeds to S206. When the frequency of the SL beam is in the Sub6 band, the process proceeds to S210.

At S206, the situation determination unit 164 determines whether the sky situation above the sub-area meets the determination condition based on the situation-related information acquired by the situation-related information acquisition unit 156 at S202. When it is determined by the situation determination unit 164 that the sky situation above the sub-area meets the determination condition, the process proceeds to S214. When it is determined by the situation determination unit 164 that the sky situation above the sub-area does not meet the determination condition, the process proceeds to S208.

At S208, the antenna control unit 154 controls the SL antenna 132 to switch the frequency of the SL beam radiated to the sub-area from the millimeter wave band to the Sub6 band. The SL antenna 132 switches the frequency of the SL beam radiated to the sub-area from the millimeter wave band to the Sub6 band according to control by the antenna control unit 154.

At S210, the situation determination unit 164 determines whether the sky situation above the sub-area meets the determination condition based on the situation-related information acquired by the situation-related information acquisition unit 156 at S202. When it is determined by the situation determination unit 164 that the sky situation above the sub-area meets the determination condition, the process proceeds to S212. When it is determined by the situation determination unit 164 that the sky situation above the sub-area does not meet the determination condition, the process proceeds to S214.

At S212, the antenna control unit 154 controls the SL antenna 132 to switch the frequency of the SL beam radiated to the sub-area from the Sub6 band to the millimeter wave band. The SL antenna 132 switches the frequency of the SL beam radiated to the sub-area from the Sub6 band to the millimeter wave band according to control by the antenna control unit 154.

At S214, the situation determination unit 164 determines whether the sky situation in all the sub-areas has been determined. When the sky situation for all the sub-areas has been determined, the process proceeds to S216. When the sky situation in all the sub-areas has not been determined, the process returns to S204.

At S216, the information processing device 150 determines whether an ending instruction has been acquired. The information processing device 150 acquires the ending instruction by receiving the ending instruction from a communication terminal owned by a user of the flight vehicle 100, for example. The information processing device 150 may acquire the ending instruction by accepting an input by a user of the information processing device 150 by using an input device included in the flight vehicle 100. When the ending instruction has not been acquired by the information processing device 150, the process returns to S102. When an ending instruction has been acquired by the information processing device 150, the process ends.

Figure 7:
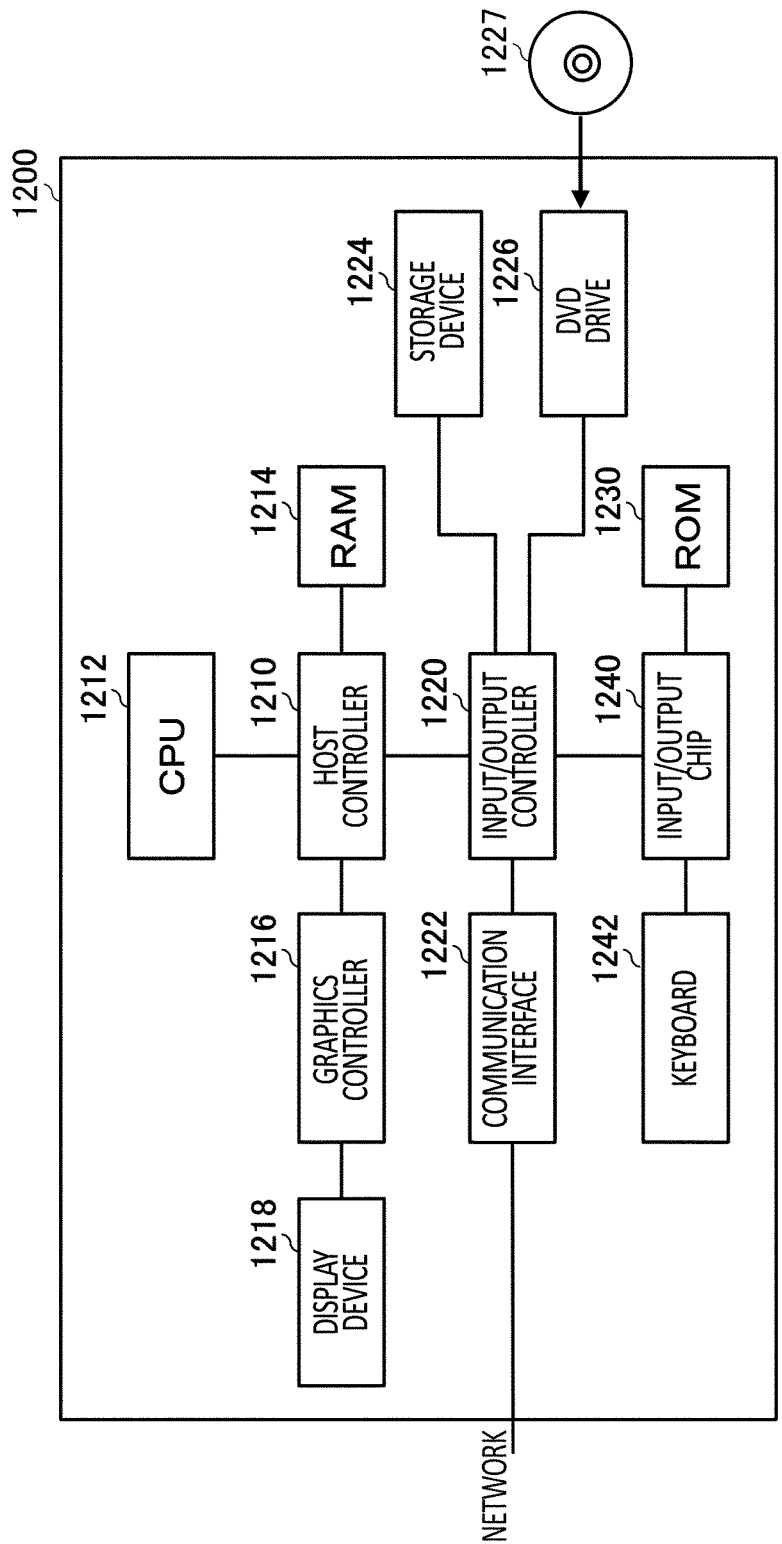
FIG. 7 schematically illustrates an example of a hardware configuration of a computer 1200 functioning as the information processing device 150 and the information processing device 300.

FIG. 7 schematically illustrates an example of a hardware configuration of a computer 1200 functioning as the information processing device 150 and the information processing device 300. Programs installed in the computer 1200 can cause the computer 1200 to function as one or more "units" of the device according to the above-described embodiment or can cause the computer 1200 to execute operations associated with the devices according to the above-described embodiment or said one or more "units", and/or can cause the computer 1200 to execute a process according to the above-described embodiment or steps of said process. Such a program may be executed by a CPU 1212 to cause the computer 1200 to perform particular operations associated with some or all of the blocks in the flowcharts and block diagrams described in the specification.

The computer 1200 according to the present embodiment includes the CPU 1212, a RAM 1214, and a graphics controller 1216, which are connected to each other via a host controller 1210. The computer 1200 also includes a communication interface 1222, a storage device 1224, a DVD drive 1226, and an input/output unit such as an IC card drive, which are connected to the host controller 1210 via an input/output controller 1220. The DVD drive 1226 may be a DVD-ROM drive, a DVD-RAM drive, and the like. The storage device 1224 may be a hard disk drive, a solid-state drive, and the like. The computer 1200 also includes legacy input/output units such as a ROM 1230 and a keyboard 1242, which are connected to the input/output controller 1220 through an input/output chip 1240.

The CPU 1212 operates according to the programs stored in the ROM 1230 and the RAM 1214, thereby controlling each unit. The graphics controller 1216 obtains image data which is generated by the CPU 1212 in a frame buffer or the like provided in the RAM 1214 or in itself so as to cause the image data to be displayed on a display device 1218.

The communication interface 1222 communicates with another electronic device via a network. The storage device 1224 stores a program and data used by the CPU 1212 in the computer 1200. The DVD drive 1226 is configured to read the programs or the data from the DVD-ROM 1227 or the like, and to provide the storage device 1224 with the programs or the data. The IC card drive reads the program and data from an IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port, or the like to the input/output controller 1220.

A program is provided by a computer-readable storage medium such as the DVD-ROM 1227 or the IC card. The program is read from the computer-readable storage medium, installed into the storage device 1224, RAM 1214, or ROM 1230, which are also examples of a computer-readable storage medium, and executed by the CPU 1212. Information processing written in these programs is read by the computer 1200, and provides cooperation between the programs and the various types of hardware resources described above. A device or method may be constituted by realizing the operation or processing of information in accordance with the usage of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM 1227, or the IC card, and transmits the read transmission data to a network or writes reception data received from a network to a reception buffer region or the like provided on the recording medium.

In addition, the CPU 1212 may be configured to cause all or a necessary portion of a file or a database, which has been stored in an external recording medium such as the storage device 1224, the DVD drive 1226 (DVD-ROM 1227), the IC card and the like, to be read into the RAM 1214, thereby executing various types of processing on the data on the RAM 1214. Then, the CPU 1212 may write the processed data back in the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among said plurality of entries, and read the attribute value of the second attribute stored in said entry, thereby acquiring the attribute value of the second attribute associated with the first attribute that meets a predetermined condition.

The programs or software module described above may be stored on the computer 1200 or in a computer-readable storage medium near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flowcharts and block diagrams in the present embodiments may represent steps of processes in which operations are performed or "units" of devices responsible for performing operations. A specific step and "unit" may be implemented by dedicated circuitry, programmable circuitry supplied along with a computer-readable instruction stored on a computer-readable storage medium, and/or a processor supplied along with the computer-readable instruction stored on the computer-readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer-readable storage medium may include any tangible device capable of storing an instruction performed by an appropriate device, so that the computer-readable storage medium having the instruction stored thereon constitutes a product including an instruction that may be performed in order to provide means for performing an operation specified by a flowchart or a block diagram. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer-readable instructions may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

The computer-readable instruction may be provided to a general-purpose computer, a special purpose computer, or a processor or programmable circuitry of another programmable data processing device locally or via a local area network (LAN), a wide area network (WAN) such as the Internet or the like in order that the general-purpose computer, the special purpose computer, or the processor or the programmable circuitry of another programmable data processing device performs said computer-readable instruction to provide means for performing operations specified by the flowchart or the block diagram. Examples of the processor include a computer processor, a processing unit, a microprocessor, a digital signal processor, a controller, a microcontroller, and the like.

While the present invention has been described by way of the embodiments, the technical scope of the present invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the present invention.

The operations, procedures, steps, and stages of each process performed by a device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system, 20: network, 30: communication satellite, 40: mobile object, 45: gateway, 50: mobile object, 55: gateway, 60: communication infrastructure, 62: connection unit: 64: power supply unit, 70: communication infrastructure, 72: connection unit, 74: power supply unit, 80: communication infrastructure, 82: connection unit, 84: power supply unit, 90: rain clouds, 95: rain clouds, 100: flight vehicle, 121: main wing, 122: main body, 124: propeller, 130: solar panel, 132: SL antenna, 134: FL antenna, 136: FL antenna, 138: satellite communication antenna, 140: wireless communication area, 142: sub-cell, 144: sub-cell, 146: sub-cell, 148: sub-cell, 150: information processing device, 152: information storage unit, 154: antenna control unit, 156: situation-related information acquisition unit, 158: position information acquisition unit, 160: information transmission unit, 162: determination condition setting unit, 164: situation determination unit, 200: user terminal, 300: information processing device, 302: information storage unit, 304: flight vehicle control unit, 306: situation-related information reception unit, 308: position information reception unit, 310: traffic-related information reception unit, 312: solar position acquisition unit, 313: attenuation amount estimation unit, 314: situation condition setting unit, 318: prediction unit, 320: supervised data storage unit, 322: model generation unit, 324: deployment determination unit, 326: mobile object control unit, 1200: computer, 1210: host controller, 1212: CPU, 1214: RAM, 1216: graphics controller, 1218: display device, 1220: input/output controller, 1222: communication interface, 1224: storage device, 1226: DVD drive, 1227: DVD-ROM, 1230: ROM, 1240: input/output chip, 1242: keyboard.

What is claimed is:

1. An information processing device comprising:
a situation-related information reception unit that receives situation-related information related to a sky situation above a ground area for which a flight vehicle that functions as a stratosphere platform provides wireless communication service to a user terminal in a wireless communication area formed by the flight vehicle by using an SL (Service Link) antenna to radiate an SL beam, the situation-related information including flight path information that indicates a flight path on which an airplane flies in the sky above the ground area; and
a deployment determination unit that determines deployment of a mobile object to an area, among the ground area, in which a sky situation meets a predetermined situation condition, based on the flight path information included in the situation-related information, in order to establish a feeder link between a gateway mounted on the mobile object and the flight vehicle,
wherein the situation condition is that the flight path is not included between the gateway and the flight vehicle when the mobile object is deployed;
wherein the situation-related information reception unit receives the situation-related information further including weather-related information related to weather in the sky above the ground area;
wherein the deployment determination unit determines deployment of the mobile object to an area, among an area that meets the situation condition, in which the weather in the sky meets a predetermined weather condition, based on the weather-related information; and
wherein the deployment determination unit determines deployment of the mobile object to the area based on an estimation result obtained by estimating, from a captured image of the ground area captured by an image capturing device mounted on the flight vehicle, the weather in the sky above the ground area by using an estimation model.

2. The information processing device according to claim 1, wherein the deployment determination unit determines deployment of the mobile object to an area, among an area that meets the situation condition, in which a cloud amount is less than a predetermined cloud amount threshold, based on the weather-related information including cloud amount information indicating a cloud amount in the sky above the ground area.

3. The information processing device according to claim 2, further comprising a mobile object control unit that controls the mobile object such that the mobile object moves to a deployment destination, in response to the deployment determination unit determining deployment of the mobile object.

4. An information processing system comprising:
the information processing device according to claim 2; and
the flight vehicle.

5. The information processing device according to claim 1, wherein the deployment determination unit determines, based on the weather-related information including rainfall amount information indicating a rainfall amount in the ground area from the sky, deployment of the mobile object to an area, among an area that meets the situation condition, in which a rainfall amount is less than a predetermined rainfall amount threshold.

6. The information processing device according to claim 5, further comprising a mobile object control unit that controls the mobile object such that the mobile object moves to a deployment destination, in response to the deployment determination unit determining deployment of the mobile object.

7. The information processing device according to claim 1, wherein the deployment determination unit determines deployment of the mobile object to an area, among an area that meets the situation condition, in which predicted rainfall is less than a predetermined predicted rainfall threshold, based on the weather-related information including predicted rainfall amount information indicating predicted rainfall in the ground area from the sky.

8. The information processing device according to claim 7, further comprising a mobile object control unit that controls the mobile object such that the mobile object moves to a deployment destination, in response to the deployment determination unit determining deployment of the mobile object.

9. The information processing device according to claim 1, wherein the deployment determination unit preferentially deploys the mobile object in a region, among the area that meets the weather condition, predicted to meet the weather condition for a longer period, based on the weather-related information.

10. The information processing device according to claim 9, further comprising a mobile object control unit that controls the mobile object such that the mobile object moves to a deployment destination, in response to the deployment determination unit determining deployment of the mobile object.

11. The information processing device according to claim 1, further comprising:
a supervised data storage unit that stores the captured image of the ground area captured by an image capturing device mounted on the flight vehicle and weather information indicating weather in the sky above the ground area after a predetermined period has elapsed since a captured time of the captured image, in association with each other; and
a model generation unit that generates, by means of machine learning, the estimation model for estimating, from the captured image received by the situation-related information reception unit from the flight vehicle, the weather in the sky above the ground area after the period has elapsed since the captured time of the captured image by using, as supervised data, a plurality of the captured images and the weather information stored in the supervised data storage unit,
wherein the captured image included in the weather-related information is received by the situation-related information reception unit from the flight vehicle.

12. The information processing device according to claim 11, further comprising a mobile object control unit that controls the mobile object such that the mobile object moves to a deployment destination, in response to the deployment determination unit determining deployment of the mobile object.

13. The information processing device according to claim 1, further comprising a mobile object control unit that controls the mobile object such that the mobile object moves to a deployment destination, in response to the deployment determination unit determining deployment of the mobile object.

14. The information processing device according to claim 13, wherein the mobile object control unit further controls the mobile object to maintain the feeder link between the gateway and the flight vehicle during movement of the mobile object.

15. The information processing device according to claim 1, further comprising a mobile object control unit that controls the mobile object such that the mobile object moves to a deployment destination, in response to the deployment determination unit determining deployment of the mobile object.

16. An information processing system comprising:
the information processing device according to claim 1; and
the flight vehicle.

17. A program that causes a computer to function as:
a situation-related information reception unit that receives situation-related information related to a sky situation above a ground area for which a flight vehicle that functions as a stratospheric platform provides wireless communication service to a user terminal in a wireless communication area formed by the flight vehicle by using an SL antenna to radiate an SL beam, the situation-related information including flight path information that indicates a flight path on which an airplane flies in the sky above the ground area; and
a deployment determination unit that determines deployment of a mobile object to an area, among the ground area, in which a sky situation meets a predetermined situation condition, based on the flight path information included in the situation-related information, in order to establish a feeder link between a gateway mounted on the mobile object and the flight vehicle, wherein the situation condition is that the flight path is not included between the gateway and the flight vehicle when the mobile object is deployed;
wherein the situation-related information reception unit receives the situation-related information further including weather-related information related to weather in the sky above the ground area;
wherein the deployment determination unit determines deployment of the mobile object to an area, among an area that meets the situation condition, in which the weather in the sky meets a predetermined weather condition, based on the weather-related information; and
wherein the deployment determination unit determines deployment of the mobile object to the area based on an estimation result obtained by estimating, from a captured image of the ground area captured by an image capturing device mounted on the flight vehicle, the weather in the sky above the ground area by using an estimation model.

18. An information processing method that is executed by a computer, comprising:
receiving situation-related information related to a sky situation above a ground area for which a flight vehicle that functions as a stratospheric platform provides wireless communication service to a user terminal in a wireless communication area formed by the flight vehicle by using an SL antenna to radiate an SL beam, the situation-related information including flight path information that indicates a flight path on which an airplane flies in the sky above the ground area; and
determining deployment of a mobile object to an area, among the ground area, in which a sky situation meets a predetermined situation condition, based on the flight path information included in the situation-related information, in order to establish a feeder link between a gateway mounted on the mobile object and the flight vehicle,
wherein the situation condition is that the flight path is not included between the gateway and the flight vehicle when the mobile object is deployed;
wherein the situation-related information includes weather-related information related to weather in the sky above the ground area;
wherein the determining deployment includes determining deployment of the mobile object to an area, among an area that meets the situation condition, in which the weather in the sky meets a predetermined weather condition, based on the weather-related information; and
wherein the deployment of the mobile object to the area is based on an estimation result obtained by estimating, from a captured image of the ground area captured by an image capturing device mounted on the flight vehicle, the weather in the sky above the ground area by using an estimation model.

19. An information processing device comprising:
a situation-related information reception unit that receives situation-related information related to a sky situation above a ground area for which a flight vehicle that functions as a stratosphere platform provides wireless communication service to a user terminal in a wireless communication area formed by the flight vehicle by using an SL (Service Link) antenna to radiate an SL beam, the situation-related information including flight path information that indicates a flight path on which an airplane flies in the sky above the ground area;
a deployment determination unit that determines deployment of a mobile object to an area, among the ground area, in which a sky situation meets a predetermined situation condition, based on the flight path information included in the situation-related information, in order to establish a feeder link between a gateway mounted on the mobile object and the flight vehicle,
a supervised data storage unit that stores a captured image of the ground area captured by an image capturing device mounted on the flight vehicle and weather information indicating weather in the sky above the ground area after a predetermined period has elapsed since a captured time of the captured image, in association with each other; and
a model generation unit that generates, by means of machine learning, an estimation model for estimating, from the captured image received by the situation-related information reception unit from the flight vehicle, the weather in the sky above the ground area after the period has elapsed since the captured time of the captured image by using, as supervised data, a plurality of the captured images and the weather information stored in the supervised data storage unit;
wherein the situation condition is that the flight path is not included between the gateway and the flight vehicle when the mobile object is deployed;
wherein the situation-related information reception unit receives the situation-related information further including weather-related information related to weather in the sky above the ground area;
wherein the deployment determination unit determines deployment of the mobile object to an area, among an area that meets the situation condition, in which the weather in the sky meets a predetermined weather condition, based on the weather-related information; and wherein the deployment determination unit determines deployment of the mobile object to an area estimated to meet the weather condition for a predetermined period, based on an estimation result obtained by estimating, from the captured image included in the weather-related information received by the situation-related information reception unit from the flight vehicle, the weather in the sky above the ground area by using the estimation model.

\* \* \* \* \*